May 29, 1915.

DRAWING

306

A careful search has been made this day for the original drawing or a photolithographic copy of the same, for the purpose of reproducing the said drawing to form a part of this book, but at this time nothing can be found from which a reproduction can be made.

Finis D. Morris,
                            Chief of Division E.

AWK.

UNITED STATES PATENT OFFICE.

WILLIAM KINNEY, OF LOUISVILLE, KENTUCKY.

COAL COOKING-STOVE.

Specification of Letters Patent No. 306, dated July 29, 1837.

*To all whom it may concern:*

Be it known that I, WILLIAM KINNEY, of the city of Louisville, county of Jefferson, State of Kentucky, have invented a new, useful, and economical Improvement in Coal Cooking-Stoves, denominated the "Bruges Stove," as improved by Messrs. Cottam and Hallan and by Mr. Edward Cottam, represented in page No. 61 in the mechanics' magazine and Vol. 6, which stove I have been manufacturing, but find it not to answer the purpose intended. The objection to the Bruges stove is on account of its not baking at bottom. In order to overcome that difficulty I have with much time and labor effected that very important improvement.

In order to test my improvement more satisfactorily I have put out several of my improved stoves in families to have them tested in a proper manner so as to ascertain if there was any defect but after a careful trial of about six weeks they all say that they can find no fault; that the improvement is useful and economical; that the stove can not be brought into general use without the improvement. With this assurance from the public of its utility and not knowing of a like improvement is my excuse for sending this specification. There is not the slightest difficulty in its use. All that is necessary is a few chips put on the grate in the bottom of coal pot so that the coal may ignite freely and put all the covers on the holes in the top of stove and a good draft is indispensable for the well performance of the stove.

The nature of my improvement is such that I can make the bottom of the oven as hot as the top or hotter if required. In order to effect this I make a hot air flue under the oven plate and up on the back of the stove between the back plate and the oven into the smoke pipe as shown in drawing Figure 2 by the pointing of arrows. I also make one or more small holes in front of the stove so as to regulate the heat on the bottom plate of the oven. If it is not hot enough I put in more holes. If too hot I lessen the number so as to increase or decrease the draft in the hot air flue under the oven. By that means I make a perfect oven of uniform heat both top and bottom. In order to make the two ends of the stove of uniform heat I use two plates in the oven next to the coal pot. I have them a certain distance apart and filled in between with nonconducting material so as to prevent the articles when baking from being scorched next to the coal pot which makes the two ends of stove of uniform heat equal to the top and bottom. The top of the stove has holes more or less to receive the battery of the cooking utensils. One of the holes is also used for feeding the coal pot with coal.

What I claim as my improvement and invention and desire to secure by Letters Patent is—

The hot air flue which passes under the bottom of the oven and up in the back part of the stove also the manner I conduct it into the smoke pipe and the holes in front of stove so as to create a draft in the hot air flue under the oven and also the two plates with nonconducting material so as to prevent scorching next to the coal pot and which makes the two ends of stove of equal heat is what I claim.

WM. KINNEY.

Witnesses:
  WM. S. VERNON,
  HENRY TIBBITTS.